US011017505B2

United States Patent
Li

(10) Patent No.: US 11,017,505 B2
(45) Date of Patent: May 25, 2021

(54) SYSTEM AND METHOD FOR APPLYING ANTIALIASING TO IMAGES

(71) Applicant: Google LLC, Mountain View, CA (US)

(72) Inventor: Yuqian Li, Durham, NC (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/653,381

(22) Filed: Oct. 15, 2019

(65) Prior Publication Data
US 2020/0043144 A1    Feb. 6, 2020

Related U.S. Application Data

(62) Division of application No. 15/723,737, filed on Oct. 3, 2017, now Pat. No. 10,482,581.

(51) Int. Cl.
| | |
|---|---|
| *G06T 5/20* | (2006.01) |
| *G06T 5/00* | (2006.01) |
| *G06T 7/13* | (2017.01) |
| *G06T 7/11* | (2017.01) |
| *G06T 11/40* | (2006.01) |

(52) U.S. Cl.
CPC ............. *G06T 5/002* (2013.01); *G06T 7/11* (2017.01); *G06T 7/13* (2017.01); *G06T 11/40* (2013.01); *G06T 5/20* (2013.01); *G06T 2207/20192* (2013.01); *G06T 2210/21* (2013.01)

(58) Field of Classification Search
CPC ..... G06T 5/02; G06T 5/20; G06T 7/11; G06T 7/13; G06T 11/40
See application file for complete search history.

(56) References Cited

U.S. PATENT DOCUMENTS

| | | | |
|---|---|---|---|
| 5,544,294 A | 8/1996 | Cho et al. | |
| 7,425,955 B2 | 9/2008 | Long et al. | |
| 8,803,872 B2* | 8/2014 | Akenine-Moller | ..... G06T 11/40 345/419 |
| 2002/0093520 A1 | 7/2002 | Larson | |
| 2004/0257607 A1* | 12/2004 | Gupta | ..... G06T 11/40 358/1.15 |
| 2006/0028472 A1* | 2/2006 | Michail | ..... G06T 15/503 345/441 |

OTHER PUBLICATIONS

"How the stb_truetype Anti-Aliased Software Rasterizer v2 Works" Sean Barrett. Jul. 7, 2015. Accessed via web @ https://nothings.org/gamedev/rasterize/. Date Accessed Nov. 2020. (Year: 2015).*

(Continued)

*Primary Examiner* — Antonio A Caschera
(74) *Attorney, Agent, or Firm* — Botos Churchill IP Law

(57) ABSTRACT

A system and method for antialiasing an image and providing it for display. By way of example, an image of an object with width W and height H may be rendered by dividing the image into portions defined by parallel scan lines coinciding with integer values between 0 and H, endpoints of the object's line segments, intersections between the object's line segments, or some combination thereof. The alpha or brightness values of pixels having regions located between two consecutive scan lines may be based on the area of trapezoidal or triangular shapes that are defined by the scan lines, the line segments, the pixel boundaries, or some combination thereof.

20 Claims, 5 Drawing Sheets

(56) References Cited

OTHER PUBLICATIONS

"Anti-aliasing Polygon Edges for Scanline Rendering" Alan Bucior. Jun. 4, 2015. Accessed via web @ http://bucior.com/antialising-polygon-edges-for-scanline-rendering/. Date accessed Nov. 2020. (Year: 2015).*
Edwin E. Catmull, "A Hidden-Surface Algorithm with Anti-Aliasing", SIGGRAPH, (1978) 3 pgs.
Jorge Jimenez, et al., "SMAA: Enhanced Subpixel Morphological Antialiasing", EUROGRAPHICS, vol. 31, No. 2 (2012) 15 pgs.
Loren Carpenter, "The A-buffer, an Antialiased Hidden Surface Method", Computer Graphics vol. 18, No. 3, (Jul. 1984) 6 pgs.
Thomas Auzinger, et al., "Analytic Anti-Aliasing of Linear Functions on Polytopes", Eurographics, vol. 31, No. 2, (2012) 10 pgs.
Thomas Auzinger, et al., "Non-Sampled Anti-Aliasing", Vision, Modeling, and Visualization, (2013) 8 pgs.
Twitter, https://twitter.com/pixelio/status/714867510730854400?lang=en, (2016).
Wikipedia, https://en.wikipedia.org/wiki/Fast_approximate_anti-aliasing, downloaded Nov. 22, 2017.
Wikipedia, https://en.wikipedia.org/wiki/Multisample_anti-aliasing, downloaded Nov. 22, 2017.

* cited by examiner

SYSTEM AND METHOD FOR APPLYING ANTIALIASING TO IMAGES

CROSS-REFERENCE TO RELATED APPLICATIONS

The present application is a divisional of U.S. application Ser. No. 15/723,737, which was filed on Oct. 3, 2017 the disclosure of which is hereby incorporated herein by reference.

BACKGROUND

Certain devices may use antialiasing techniques to make the edges of rendered objects appear smoother than the edges would appear in the absence of the technique. For instance, rasterization of an image may include some form of antialiasing in order to remove unwanted aliasing in the display, e.g., jagged or pixelated edges that occur when a shape has a boundary that falls between pixels. Antialiasing smoothes out these edges by blending the colors and alphas or transparencies of the pixels around the object to create the illusion of smoothness.

Certain antialiasing techniques are based on sampling. For example, a rasterization system may perform 4×4 (16) supersampling-based antialiasing for each pixel. Such forms of antialiasing may be slower than necessary, depending on the amount of unnecessary sampling. Prior supersampling approaches may also generate images of poor quality by providing less than optimal alpha values, which define the transparency or opacity of the pixel. For example, pixels may require a large number of different possible alpha values, such as 256 alpha levels, in order to provide good antialiasing results. Methods using 4×4 supersampling approaches, however, may only provide 17 (e.g., 16+1) different alpha levels. Moreover, when the edge of a path is close to horizontal or vertical lines, the 4×4 supersampling approach may only generate 5 (e.g., 4+1) different levels of alpha, which may be less than ideal.

At least some approaches for antialiasing are based on signal processing/filtering. Such methods may apply low-pass filters either to the geometry of shapes before rasterizing or to the bitmaps after rasterizing. Although antialiasing by filtering can have acceptable performance in complex 3D scenes, image quality can be problematic when geometric shapes to be outputted for display have sharp angles and lines where low-pass filtering will generate unwanted smooth outputs.

SUMMARY

Aspects of the technology described herein relate to techniques for rendering and displaying images with antialiasing. For instance, one aspect of the technology relates to a system that includes a memory for storing a plurality of line segments having endpoints that collectively define an object. The system determines the location of a plurality of reference lines, wherein the location of at least one reference line corresponds with the endpoint of a line segment and the location of at least one reference line corresponds with an intersection between two of the line segments. The system determines, for each pixel of an image, a pixel value associated with visual characteristics of the pixel, wherein a pixel value is based on the amount of overlap between a portion of the object between two consecutive reference lines and the region associated with the pixel. The system then provides the image for display.

Another aspect of the technology relates to a method for providing an image of an object for display in an image comprised of pixels, wherein the object has edges comprised of line segments. The method includes: identifying, with one or more computing devices, a first set of locations that correspond with end points of the line segments within the image; identifying, with the one or more computing devices, a second set of locations that correspond with intersections of line segments within the image; identifying, with the one or more computing devices, a third set of locations that correspond with the size of the pixels, wherein the first, second and third set collectively comprising a set of reference locations; determining, for a region of the image and with the one or more computing devices, the area of the region occupied by a portion of the object, the region comprising the region between a first reference line having a location corresponding with a first reference location and a second reference line having a location corresponding with a second reference location, wherein the first reference line is parallel to the second reference line; determining, based on the area of the region occupied by the portion of the object and with the one or more computing devices, a pixel value for a pixel associated with the region and; providing the image for display.

A further aspect of the technology relates to a non-transitory computing-device readable storage medium on which computing-device readable instructions of a program are stored, the instructions, when executed by one or more computing devices, causing the one or more computing devices to perform a method. The method includes: determining the location of a plurality of scan lines for an image having a width of W and height of H along x and y coordinates, wherein, the region of the image to be rendered is defined by [0, W]×[0, H] and the location of a scan line is $y=c_i$, where $c_i$ is selected from the group consisting of (a) an integer between 0 and H, (b) the y value of an endpoint of a first line segment to be rendered with antialiasing, or (c) the y value of an intersection of the first line segment with a second line segment; determining the area of a trapezoid between consecutive scan lines, wherein one side of the trapezoid is defined by the first line segment and the remaining three sides of the trapezoid are defined by one or more of the consecutive scan lines, the second line segment, or the boundary of a pixel intersected by the first line segment; determining the alpha or brightness value of a plurality of pixels intersected by the first line segment based on the area of the trapezoid; and determining an image based on the plurality of pixels.

The technology described herein may be used to enhance memory and processing resources of computing devices. For instance, user devices often have limited power and processing resources. Aspects of the technology may use less scan lines than certain existing technologies, which may improve devices by saving processing and memory resources and providing more memory and processing resources for other programs. The reduction of processing resources may also reduce battery consumption.

DETAILED DESCRIPTION

Overview

Figure 3:
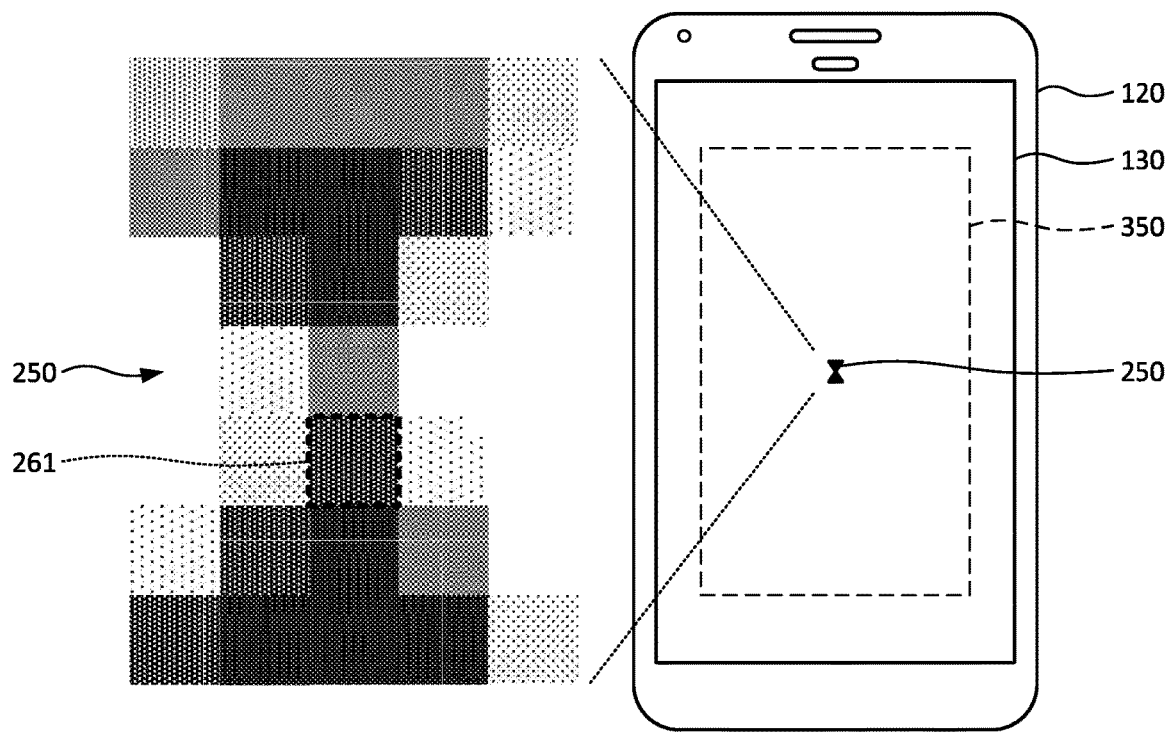
FIG. 3 is an example of an object rendered with antialiasing on a display.

The technology relates to a system and method for providing an image with antialiasing for display. For instance, FIG. 3 provides an illustration of how object 250, which is composed of line segments, may be displayed with antialiasing on a device.

Figure 1:
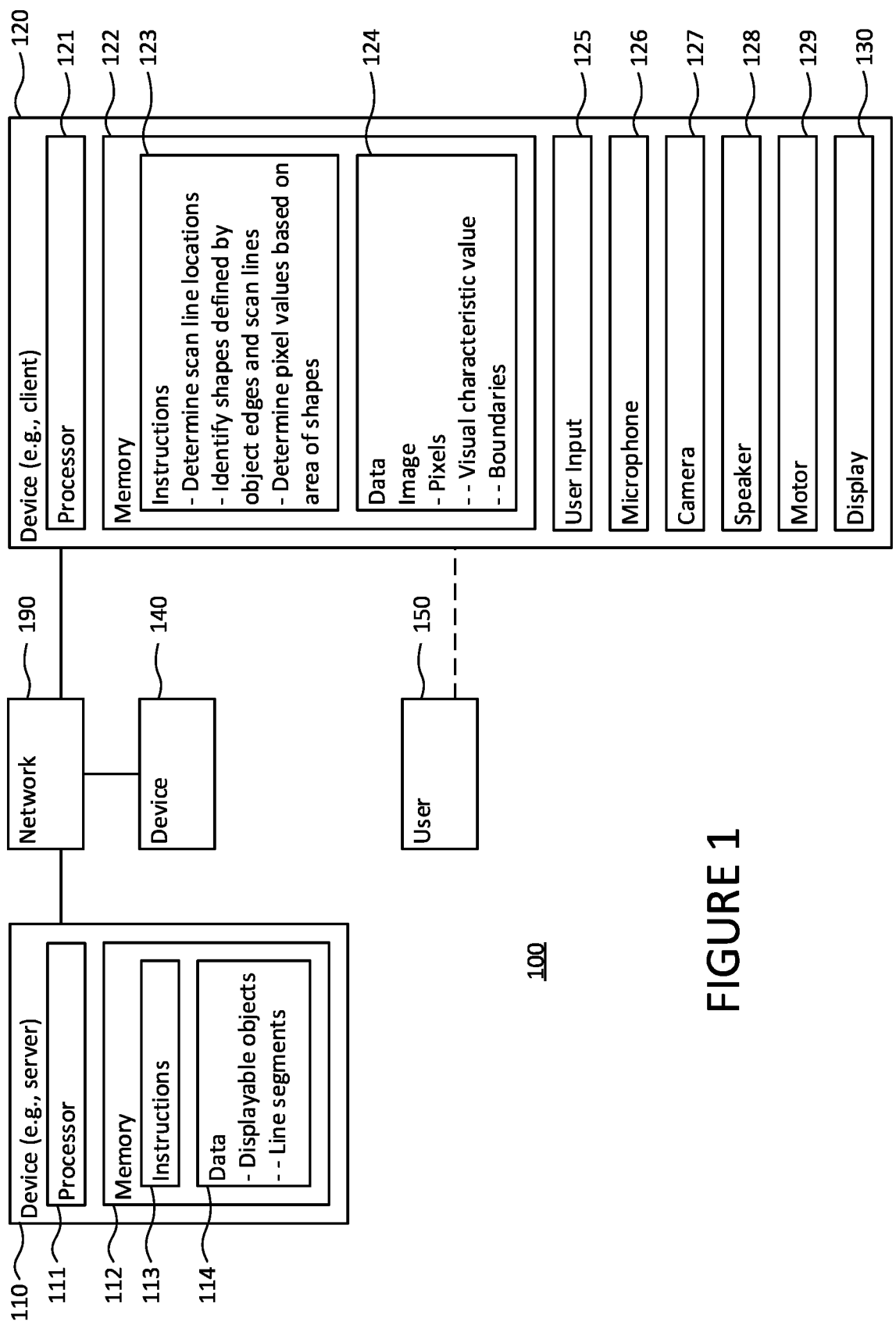
FIG. 1 is a block diagram illustrating an example system according to aspects of the disclosure.
Figure 2:
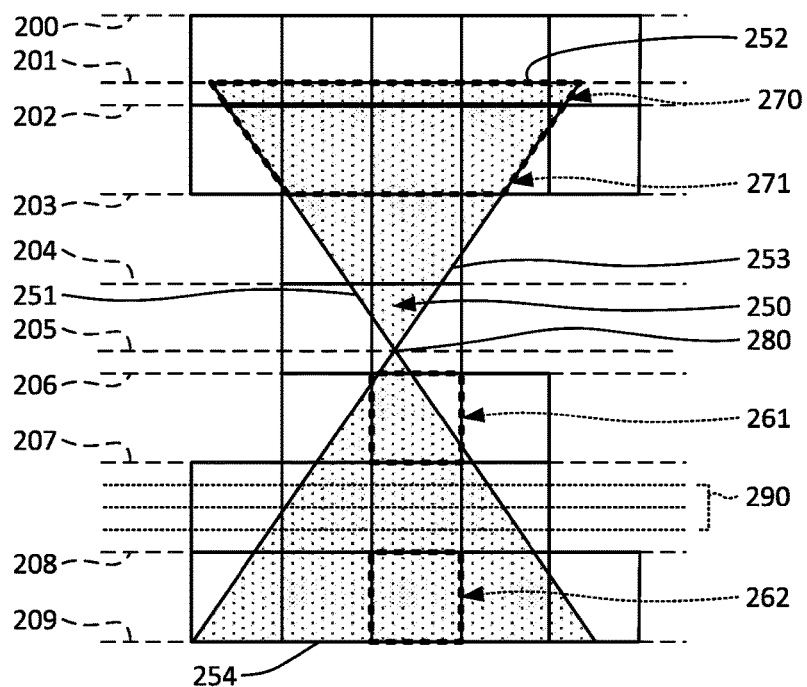
FIG. 2 is a diagram illustrating the intersection of pixel images with an object to be drawn.

As shown in FIGS. 1 and 2, system 100 may generate an image of an object to be rendered with antialiasing by using horizontal scan lines that have locations corresponding with the endpoints or intersections of line segments defining edges of the object. The image may also be generated by using scan lines that are spaced apart from one another by a distance that corresponds with the height of a pixel. The value of pixels having regions located between two consecutive scan lines may be based on the area of the trapezoids and triangular shapes defined by the boundaries of the pixels, the scan lines, and the line segments.

Figure 4A:
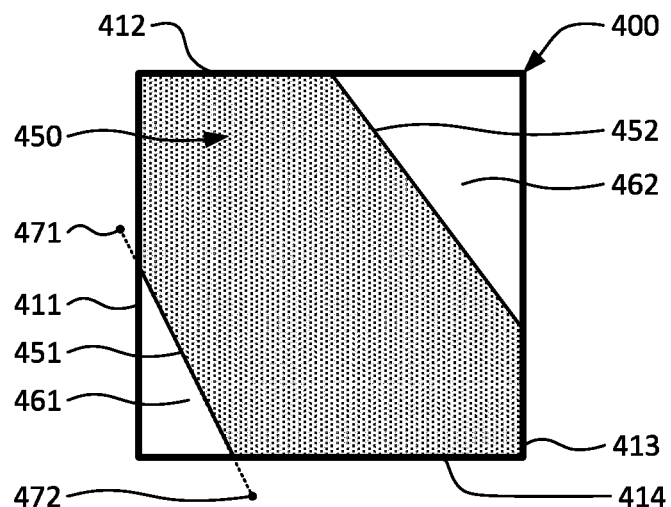
FIG. 4(a) and FIG. 4(b) are an example of calculating the area of a pixel region that is occupied by an object.
Figure 4B:
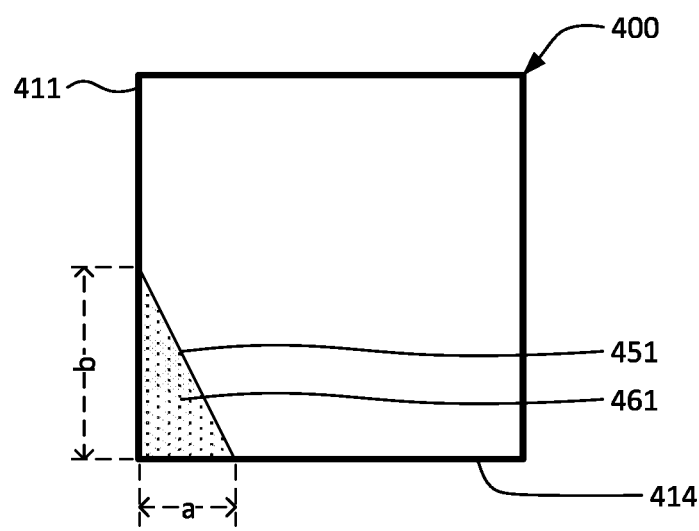

The system may determine the values of individual pixels based on the percentage of the area of a pixel region that is occupied by an object of the image. By way of example and as shown in FIGS. 4(a) and 4(b), the system may determine the area of triangular portion 461 defined by pixel boundary 411, pixel boundary 414, and left edge 451 of the object to be rendered. The area may be calculated based on the length of segment "a" and the slope of edge 451. The area of the triangular region 462 may be similarly calculated. The area of the portion of pixel region 400 that is occupied by object 450 may be calculated by subtracting the area of triangular region 461 and 462 from the total area of the pixel region. One or more of the visual characteristics of the pixel, such as its brightness or alpha value, may be determined and set based on the area of the occupied portion relative to the total area of the pixel region.

Example Systems

Systems for rendering graphics with may include one or more computing devices and one or more displays. For instance, FIG. 1 provides the example of system 100, which includes computing devices 110, 120 and 140. The computing devices are configured to accept information, perform operations based on that information, and take an action or provide additional information in response. The computing devices may be, or include, a processor that is capable of receiving one or more electrical signals representing information expressed as a numerical value as input, determine a numerical value based on the input in accordance with instructions, and provide one or more electrical signals that represent the determined numerical value as output. Device 110 includes processor 111, which may be a commercially available central processing unit (CPU), a graphics processing unit (GPU), application-specific integrated circuit (ASIC) or field-programmable gate array.

The instructions used by a computing device include any set of one or more instructions that are accessed and executed by the computing device. By way of example, device 110 stores values representing instructions 113 and processor 111 is able to access those values and perform, or cause other components of device 110 or system 100 to automatically perform, operations associated with those instructions. Instructions 113 may be stored in a format that is capable of execution by processor 111 with or without additional processing, e.g., machine code, object code, script, or independent source code modules that are interpreted on demand. An operation expressed as a single instruction in one format may correspond with multiple instructions in another format, e.g., executing a single command in script may require the execution of multiple machine code instructions. Some of the operations described herein may involve the execution of instructions provided by an operating system.

The instructions may be stored in a memory. For instance, instructions 113 are stored in memory 112. The memory may be any component that is capable of storing information on a non-transitory storage medium that can be read by a computing device, e.g., registers provided by processor 111, volatile memory such as RAM (random-access memory), non-volatile memory such as flash memory (e.g., a Secure Digital (SD) card), a hard-disk drive, a solid-state drive, optical storage, or tape backups. Device 110, processor 111 and memory 112 are configured so that processor 111 can read, modify, delete and add values stored in memory 112. Memory may be configured to provide less access than the example of memory 112, e.g., the memory may be read-only.

Memory may store information that is used by, or results from, the operations performed by the computing device. By way of example, memory 112 stores data 114, which includes values that are retrieved or stored by processor 111 in accordance with instructions 113, such as information that is required or determined by device 110 when performing some of the operations described herein. Values stored in memory 112 may be stored in accordance with one or more data structures. For instance, a value stored in memory 112 may represent a single numeric value (e.g., a binary number, an integer, a floating point number, a Unicode value representing a single character of text, digit or punctuation mark, or a value representing a single machine code instruction), a set of multiple numeric values (e.g., an array of numbers, a string of text characters, XML-formatted data, or a file), or information from which values to be processed in accordance with instructions 113 may be obtained (e.g., a reference to a value stored at a remote location or a parameter of a function from which the required value is calculated).

A computing device may include components for receiving information from the physical environment surrounding the device to allow direct user input to the device. Similar to device 110, device 120 includes a processor 121, memory 122, instructions 123 and data 124. Device 120 also includes components that detect information relating to the physical environment in which the component is disposed, and this information may include information provided by user 150. Device 110 includes a user input component 125 having circuitry and other components configured to receive input from user 150, such as information provided tactilely (e.g., a mouse, keyboard, keypad, button or touchscreen). User input components may perform functions that are not primarily directed to user input. By way of example, camera 127 may be used to capture user commands (e.g., hand gestures) and other visual information (e.g., the visual characteristics of a mountain). Microphone 126 may be used to capture user commands (e.g., verbal commands) and other audio information (e.g., the sound of a waterfall).

A computing device may include components for providing information via the physical environment surrounding the device to provide output directly to users. For example, a component may include circuitry that outputs visual, audio or tactile (e.g., haptic) information to users of the device, such as electronic display 130 (e.g., a computer monitor, a touch-screen, a projector or another component that is operable to change a visual characteristic in response to a signal), speaker 128, or actuator 129 to vibrate the device.

A computing device may include one or more components for communicating with other computing devices. By way of example, devices 110, 120 and 140 include circuitry (e.g., a network interface) connecting each device to a different node of communication network 190. Network 190 may be composed of multiple networks using different communication protocols. For instance, when device 110 transmits information to device 120, the information may be sent over one or more of the Internet (e.g., via core Internet routers in accordance with the Transmission Control Protocol (TCP) and Internet Protocol (IP)), a cellular network (e.g., in accordance with the LTE (Long-Term Evolution) standard), a local network (e.g., an Ethernet or Wi-Fi network), or a Bluetooth connection. A device may provide information to a user via other devices, e.g., device 110 may display information to user 150 by sending the information via network 190 to device 120 for display on display 130. A computing device may also provide information to another computing device without the use of a network. By way of example, one computing device may output information with a display and another computing device may detect that information with a camera. Although only a few computing devices are depicted in FIG. 1, the system may include a large number of computing devices that are connected to the network at a large number of nodes.

Although FIG. 1 shows computing devices 110 and 120 as individual blocks, each of which contains its own processor and memory, the operations described herein may involve a single computing device or many computing devices, e.g., in the "cloud". For example, various operations described below as involving a single computing device (e.g., a single central processing unit (CPU) in a single server) may involve a plurality of computing devices (e.g., multiple processors in a load-balanced server farm or otherwise having a distributed configuration). Similarly, memory components at different locations may store different portions of instructions 113 and collectively form a medium for storing the instructions. By way of further example, operations described as involving a plurality of computing devices may be performed by a single computing device, e.g., rather than sending data to device 110 for processing, device 120 may process the data itself. Alternatively, device 120 may function as a "thin" client wherein device 110 performs all or nearly all operations that are not directly related to receiving and providing information to user 150 via user input component 125 and display 130. Various operations described herein as being performed by a computing device may be performed by a virtual machine. By way of example, instructions 113 may be specific to a Windows server, but the relevant operations may be performed by a Linux server running a hypervisor that emulates a Windows server. The operations may also be performed by a container, e.g., a computing environment that does not rely on an operating system tied to specific types of hardware.

In many of the examples described herein, device 110 is a server and devices 120 and 140 are client devices. For instance, device 110 may be a web server and device 120 may be a desktop computer system, e.g., processor 121 and memory 122 may be contained in a desktop personal computer, display 130 may be an external monitor connected to the personal computer by a cable, and user input component 125 may be an external keyboard that communicates with the computer via Bluetooth. Alternatively, device 120 may be a wireless phone with a touchscreen that functions as both display 130 and user input component 125. Other client devices may include, by way of example, laptops, notebooks, netbooks, tablets, set-top boxes (e.g., a cable-television set-top box connected to a television) and wearable devices (e.g., a smartwatch). In that regard, a computing device may include other components that are typically present in such devices or general purpose computers but are not expressly described herein.

Example Methods

Operations in accordance with a variety of aspects of the method will now be described. It should be understood that the following operations do not have to be performed in the precise order described below. Rather, various steps can be handled in different order or simultaneously.

An object may be displayed in response to a request from a user. For instance, user 150 of device 120 may request, via a browser, a webpage stored on device 110. The webpage may include an image to be displayed, such as a visual object defined by vector data (e.g., line segment endpoints, points defining a curve, line colors, fill colors, etc.). The image may be sent to device 120 via network 190 in the format in which it is stored in memory 112. Device 120 may render and display the image with antialiasing. Device 120 may also apply antialiasing to images it receives in a rasterized format, such as applying antialiasing during resizing based on the endpoints and intersections of object edges detected in a bitmap image. The operations described below with respect to line segments may also be applied to curves. For example, the operations may be performed relative to a curve's endpoints and intersection with other curves or line segments. In addition or alternatively, the system may convert a curve into a series of connected line segments for the purposes of antialiasing.

The system may render an object to be displayed by identifying the pixels that intersect with at least a portion of the object to be displayed. Object 250 in FIG. 2 provides an example of a two-dimensional object whose edges are defined by and stored as a set of line segments 251-254. In this example, the edges and interior of object 250 are black and each square in FIG. 2 represents a region of an image associated with a single pixel. While the dimensions and shape may differ depending on the nature of the medium on which the image is displayed, for ease of illustration the pixel regions in the FIG. 2 are equally-sized squares arrayed in rows and columns. The locations associated with the pixel regions and object 250 may be normalized so that locations referenced herein are expressed relative to the same reference system. In the examples described herein, the normalized length of the side of a single pixel is 1.0.

Each pixel may be capable of displaying one or more visual characteristics, such as hue, saturation, brightness, color (e.g., a combination of color values for red, green or blue), and other characteristics such as opacity (e.g., an alpha value). For ease of illustration, each pixel shown in FIG. 2 is described below as if it is capable of displaying a single color at different brightness levels that are uniform across the pixel's entire region, wherein a pixel value of 0.0 corresponds with minimum brightness (e.g., black), a pixel value of 1.0 corresponds with maximum brightness (e.g., white), and pixel values between 0.0 and 1.0 correspond with brightness values between the minimum and maximum brightness values (e.g., hues of gray).

The system may determine a pixel's value based on the amount of the pixel's area that is associated with the object to be displayed. By way of example, the pixel value may be based on the area of the pixel's entire region relative to the area of the portion of the object that intersects the pixel's region. For instance, since the region defined by the boundaries of pixel 262 is located completely within the interior of object 250, the object overlaps with 100% of the pixel's entire area and, as a result, the system may set the brightness value of pixel 262 to 0.0 (black) since the interior color of object 250 is black. Since object 250 intersects with 80% of the area of pixel 262, the brightness value of pixel 262 may be set to 0.2 (e.g., 1.0 minus 0.8).

Instead of directly determining a pixel's value by directly calculating the amount of its region's overlap with an object, the system may indirectly calculate that amount by determining the amount that its region does not overlap with the object. For instance and as shown in FIG. 4, the system may not directly calculate the area of the six-sided shape formed by the intersection of object 450 with pixel region 400. Rather, if the portions of the region that do not intersect with the object form shapes whose areas are relatively easy to calculate (e.g., trapezoids, including rectangles, and triangles), the system may first calculate the total area of the unoccupied regions. By way of example and as shown in FIG. 4(a), the system may first calculate the area of triangular region 461 between the object's left edge, which is defined by line segment 451, left pixel boundary 411 and bottom pixel boundary 414. Since region 461 is triangular, its area may be calculated based on the function $\{(a*b)/2\}$, where distances "a" and "b" represent the distance along a pixel boundary that is between a neighboring pixel region boundary and the point at which an edge intersects the boundary. Since the slope of the line segment representing the edge equals a/b, the area may be calculated based on the function $\{a*a*slope)/2\}$. The slope of a line segment may be determined from its endpoints, e.g., the slope of line segment 451 may be determined based on its endpoints 471 and 472, which extend beyond the boundaries of pixel region 400. The value of "a" may be calculated based on the slope, the coordinate value of an endpoint of the line segment, and the pixel's column position (assuming a pixel width of 1), e.g., by using the slope formula $\{(y_2-y_1)/(x_2-x_1)\}$. The process of dividing a value by two may be performed by shifting a binary value by one bit to the right. As a result, the area of region 461 may be calculated in C++ based on the function $\{a*a*slope>>1\}$. The area for region 462 may be similarly determined based on the slope of line segment 452 corresponding with the object's right edge, top boundary 412 and right boundary 413. In that regard, the area of pixel region 400 occupied by object 450 may be determined based on the function $\{1-(a_{451}*a_{451}*slope_{451}>>1)+(a_{452}*a_{452}*slope_{452}>>1)\}$, where "451" and "452" refer to line segments 451.

Figure 5:
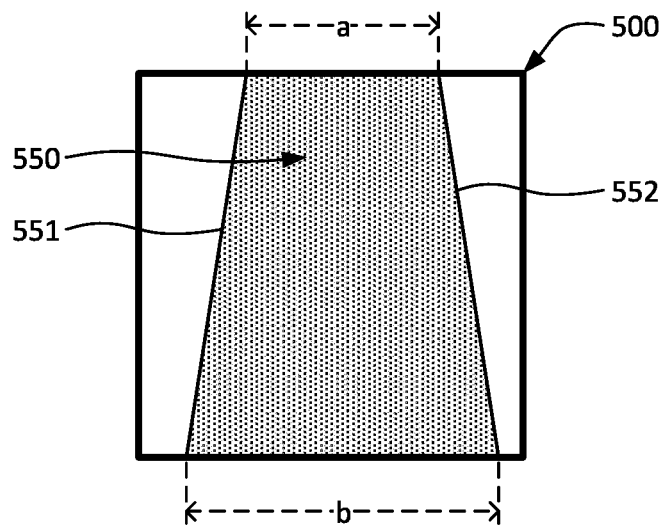
FIG. 5 is an example of calculating the area of a pixel region that is occupied by an object.

The amount of pixel area occupied by an object may also be determined directly based on the shape of the intersection between the object and the pixel area. For example and as shown in FIG. 5, left object edge 551 and right object edge 552 of object 550 may form a trapezoid within pixel region 500. As such, rather than calculating the area of the unoccupied portions of the pixel region, the system may determine the length of top edge "a" and the length of top edge "b" as described above in connection with FIG. 4, and calculate the occupied area of pixel region 500 based on the function $((a+b)>>1)$.

The system may calculate the occupied portion of a pixel region relative to reference lines having locations that are likely to form occupied or unoccupied regions with shapes having areas that are relatively easy to calculate. For instance, when an output image has a width of W and height of H such that the draw region is [0, W]×[0, H], the location of the reference lines may be determined based on the function $\{y=c_i\}$, where $c_i$ is one or more of (a) an integer between 0 and H, (b) the y value of a line segment endpoint, and (c) the y value of an intersection of two line segments. As shown in FIG. 2, the system may locate horizontal reference lines 201 and 209 at the endpoints of line segments 251 and 253, horizontal reference line 205 at intersection 280 of line segments 251 and 253, and horizontal reference lines 200, 202, 203, 204, 206, 207, 208 and 209 at equal distances from each other and at locations that correspond with the upper and lower boundaries of pixel regions. The location of a first reference line, the closest reference line to the first reference line, and an object's edges may form shapes whose areas are relatively easy to calculate. For instance, two consecutive reference lines at $y=c_i$, $y=c_{\{i+1\}}$ may define the top and bottom edges of trapezoids whose sides are defined by the object's line segments (e.g., trapezoid 270 between reference lines 201 and 202 and trapezoid 271 between reference lines 202 and 203). Two consecutive reference lines at $y=c_i$, $y=c_{\{i+1\}}$ may also form the base and define the height of a triangle (e.g., the triangular portions between reference lines 204 and 205, and reference lines 205 and 206). A reference lines may effectively divide the image into strips from which the amount of overlap can be determined based on the triangular and trapezoidal shapes formed by the reference lines and the object's edges. Although the reference lines shown in the figures are horizontal, reference lines at other angles may be used as well.

When a reference line extends through the middle of a pixel region, the total amount of the region that is occupied by the object may be determined based on the individual amounts of the occupied regions between the reference lines. For instance, the portions of the pixel regions between reference lines 200 and 201 are unoccupied rectangles whose areas may be calculated based on the width of the pixel regions and the vertical distance between reference lines 200 and 201. The portions of the pixel regions between reference lines 201 and 202 form trapezoidal shapes whose areas are also relatively easy to calculate 5.

The reference lines may also function as scan lines. For example, some prior techniques use scan lines to sample the image to be rendered at discrete points. By way of example, for non-antialiased rasterization, an image may be sampled at discrete points along equally spaced scan lines such as $y=\frac{1}{2}+0, \frac{1}{2}+1, \frac{1}{2}+2, \ldots$ or, for antialiased 16 supersampling in FIG. 2, at $y=+0, \frac{1}{8}+\frac{1}{4}, \frac{1}{8}+\frac{2}{4}, \frac{1}{8}+\frac{3}{4}, \ldots$ . System 100 may similarly use the reference lines as sample lines, with the added advantage of being less computationally intense because selecting the scan lines as described in above in connection with FIG. 2 will often result in less scan lines than super sampling. FIG. 2 shows, for the purpose of contrast, scan lines 290 that may be located in accordance with such prior techniques. In that regard, the technology described herein may improve devices by saving processing and memory resources, which provides more memory and processing resources for other programs in systems with limited resources and may reduce battery consumption. The technology may also be used to provide antialiasing in raster back ends and in other graphics libraries that work across a variety of hardware and software platforms.

The antialiased image may be provided for display. By way of example and as shown in FIG. 3, object 250 may be one portion of a larger image 350 displayed on display 130 of device 120. Object 250 may be rendered as a set of pixels wherein the visual characteristics is based at least in part on the area of the occupied region of the pixel. For instance, as noted above, the brightness of individual pixels such as pixel 261 may be based on the extent of overlap between the object to be drawn and the area of the pixel regions. The image may also be provided for display by providing the image to a printer for printing.

Figure 6:
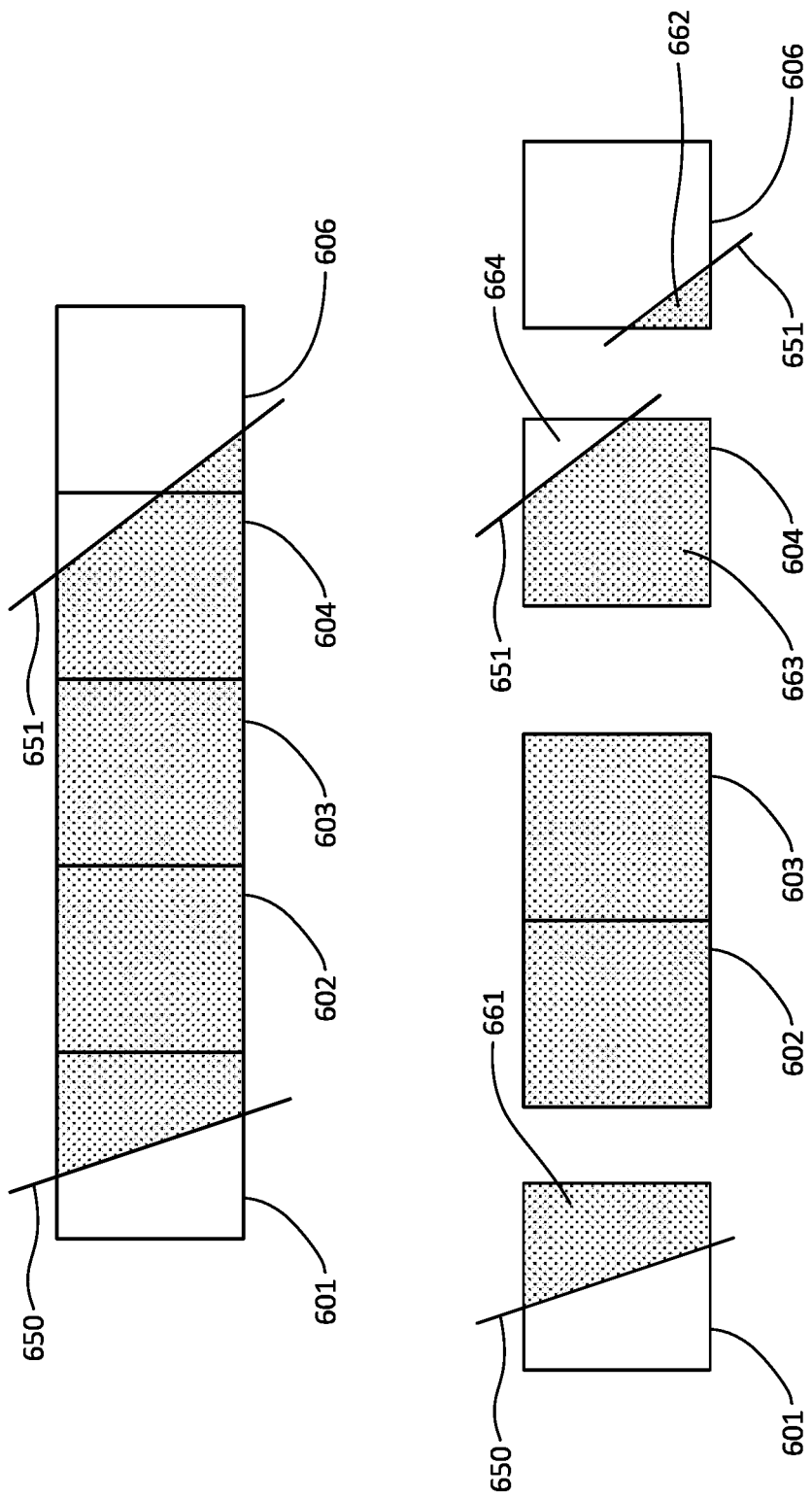
FIG. 6 is an example of calculating the area of multiple pixel regions that are occupied by an object.

FIG. 6 provides an example of the various methods by which the pixels values of a set of contiguous pixels may be calculated. For instance, the portion of an object to be drawn may extend between edges 650 and 651 and span multiple pixel regions. Since pixel regions 602 and 603 are occupied 100% by the object to be drawn, the pixel value may be based on an overlap of 100% with no additional calculation. The occupied region 661 of pixel region 601 is a trapezoid and the occupied area 662 of pixel 606 is a triangle and, as such, may both be calculated directly. The occupied region 663 of pixel 604 is more complex than triangular unoccupied region 664, so the area of occupied region 663 may be calculated indirectly based on the area of unoccupied region 664.

Figure 7:
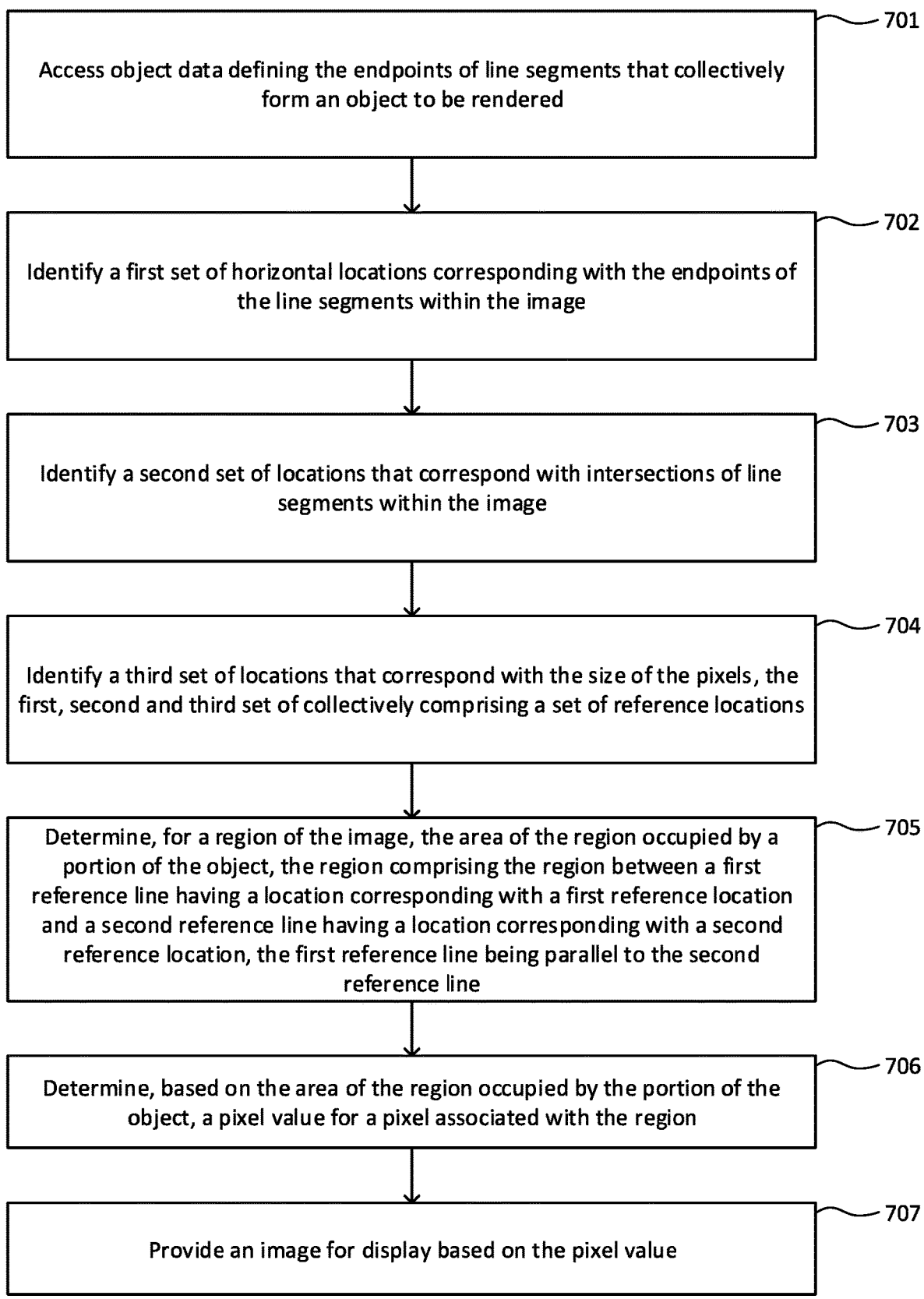
FIG. 7 is a flow diagram illustrating an example method according to aspects of the disclosure.

FIG. 7 provides an example of a method consistent the features described above. At block 701, object data that defines the endpoints of line segments that collectively form an object to be rendered is accessed. At block 702, a first set of horizontal locations is identified that corresponds with the endpoints of the line segments within the image. At block 703, a second set of locations is identified that corresponds with intersections of line segments within the image. At block 704, a third set of locations is identified that corresponds with the size of the pixels, the first, second and third set collectively comprising a set of reference locations. At block 705, the area of a region of the image that is occupied by a portion of the object is determined, the region comprising the region between a first reference line having a location corresponding with a first reference location and a second reference line having a location corresponding with a second reference location, the first reference line being parallel to the second reference line. At block 706, based on the area of the region occupied by the portion of the object, a pixel value for a pixel associated with the region is determined. At block 707, an image based on the pixel value is provided for display.

As these and other variations and combinations of the features discussed above can be utilized without departing from the claimed subject matter, the foregoing description of the embodiments should be taken by way of illustration rather than by way of limitation. The provision of examples (as well as clauses phrased as "such as," "e.g.", "including" and the like) should not be interpreted as limiting the claims to the specific examples; rather, the examples are intended to illustrate only some of many possible aspects. Similarly, references to "based on" and the like means "based at least in part on".

The invention claimed is:

1. A non-transitory computing-device readable storage medium on which computing-device readable instructions of a program are stored, the instructions, when executed by one or more computing devices, causing the one or more computing devices to perform a method of antialiasing an image, the method comprising:

determining locations of a plurality of parallel scan lines for an image having a width of W and height of H along x and y coordinates, respectively, wherein a region of the image is [0, W]×[0, H] and the location of a scan line is y=$c_i$, where $c_i$ is selected from the group consisting of (a) an integer between 0 and H, (b) the y value of an endpoint of a first line segment to be rendered with antialiasing, or (c) the y value of an intersection of a first line segment with a second line segment;

determining an area of a trapezoid between consecutive scan lines, wherein one side of the trapezoid is defined by the first line segment and the remaining three sides of the trapezoid are defined by one or more of the consecutive scan lines, the second line segment, or a boundary of a pixel intersected by the first line segment;

determining an alpha or brightness value of at least one pixel of a plurality of pixels that are intersected by the first line segment based on the area of the trapezoid; and providing the image for display on an electronic display or for printing based on the plurality of pixels.

2. The non-transitory computing-device readable storage medium of claim 1, wherein the area of the trapezoid is determined based on a slope of the first line segment.

3. The non-transitory computing-device readable storage medium of claim 1, wherein H represents the height of the image in pixels.

4. The non-transitory computing-device readable storage medium of claim 1, further comprising determining an area of a triangle between consecutive scan lines, wherein one side of the triangle is defined by the first line segment, and the remaining sides of the triangle are defined by one or more of the second line segment, a scan line, or a boundary of a pixel intersected by the first line segment or second line segment.

5. The non-transitory computing-device readable storage medium of claim 4, wherein determining the alpha or brightness value of the plurality of pixels intersected by the first line segment is further based on the area of the triangle.

6. The non-transitory computing-device readable storage medium of claim 1 wherein determining the alpha or brightness value of the plurality of pixels intersected by the first line segment is further based on the area of overlap between the trapezoid and one or more of the plurality of pixels.

7. The medium of claim 6, wherein determining the alpha or brightness value of the plurality of pixels intersected by the first line segment is further based on a pixel area of a given pixel of the plurality of pixels relative to the area of overlap.

8. A system of providing an antialiased image for display, the system comprising:

one or more computing devices; and memory storing instructions and data, the instructions being executable by the one or more computing devices and the data comprising an image to be displayed, the image being comprised of a plurality of line segments having endpoints, and the image having a width of W and a height of H along x and y coordinates, respectively, wherein a region of the image is [0, W]×[0, H], wherein the one or more computing devices are configured to execute the instructions to:

determine locations of a plurality of parallel scan lines for the image, wherein the location of a scan line is y=$c_i$, and wherein $c_i$ is selected from the group consisting of (a) an integer between 0 and H, (b) the y value of an endpoint of a first line segment to be rendered with antialiasing, or (c) the y value of an intersection of a first line segment with a second line segment, determine an area of a trapezoid between consecutive scan lines, wherein one side of the trapezoid is defined by the first line segment and the remaining three sides of the trapezoid are defined by one or more of the consecutive scan lines, the second line segment, or a boundary of a pixel intersected by the first line segment, determine an alpha or brightness value of at least one pixel of a plurality of pixels that are intersected by the first line segment based on the area of the trapezoid, and provide the image for display based on the plurality of pixels.

9. The system of claim 8, wherein determination of the area of the trapezoid is based on a slope of the first line segment.

10. The system of claim 8, wherein H represents the height of the image in pixels.

11. The system of claim 8, wherein the one or more computing devices are further configured to:

determine an area of a triangle between consecutive scan lines, wherein one side of the triangle is defined by the first line segment, and the remaining sides of the triangle are defined by one or more of the second line segment, a scan line, or a boundary of a pixel intersected by the first line segment or second line segment.

12. The system of claim 11, wherein determination of the alpha or brightness value of the plurality of pixels intersected by the first line segment is further based on the area of the triangle.

13. The system of claim 8, wherein determination of the alpha or brightness value of the plurality of pixels intersected by the first line segment is further based on the area of overlap between the trapezoid and one or more of the plurality of pixels.

14. A method of antialiasing an image, the method comprising:

determining, by one or more computing devices, locations of a plurality of parallel scan lines for an image having a width of W and height of H along x and y coordinates, respectively, wherein a region of the image is [0, W]×[0, H] and the location of a scan line is y=ci, where ci is selected from the group consisting of (a) an integer between 0 and H, (b) the y value of an endpoint of a first line segment to be rendered with antialiasing, or (c) the y value of an intersection of a first line segment with a second line segment;

determining, by the one or more computing devices, an area of a trapezoid between consecutive scan lines, wherein one side of the trapezoid is defined by the first line segment and the remaining three sides of the trapezoid are defined by one or more of the consecutive scan lines, the second line segment, or a boundary of a pixel intersected by the first line segment;

determining, by the one or more computing devices, an alpha or brightness value of at least one pixel a plurality of pixels that are intersected by the first line segment based on the area of the trapezoid; and providing the image for display on an electronic display or for printing based on the plurality of pixels.

15. The method of claim 14, wherein the area of the trapezoid is determined based on a slope of the first line segment.

16. The method of claim 14, wherein H represents the height of the image in pixels.

17. The method of claim 14, further comprising determining an area of a triangle between consecutive scan lines, wherein one side of the triangle is defined by the first line segment, and the remaining sides of the triangle are defined by one or more of the second line segment, a scan line, or a boundary of a pixel intersected by the first line segment or second line segment.

18. The method of claim 17, wherein determining the alpha or brightness value of the plurality of pixels intersected by the first line segment is further based on the area of the triangle.

19. The method of claim 14, wherein determining the alpha or brightness value of the plurality of pixels intersected by the first line segment is further based on the area of overlap between the trapezoid and one or more of the plurality of pixels.

20. The method of claim 19, wherein determining the alpha or brightness value of the plurality of pixels intersected by the first line segment is further based on a pixel area of a given pixel of the plurality of pixels relative to the area of overlap.

* * * * *